United States Patent [19]

Okada et al.

[11] Patent Number: 4,850,203

[45] Date of Patent: Jul. 25, 1989

[54] AIR CONDITIONER CONTROL APPARATUS

[75] Inventors: Tetsuji Okada; Hiroyuki Umemura; Kenji Matsuda; Hidenori Ishioka; Katsuyuki Aoki, all of Shizuoka, Japan

[73] Assignee: Mitsubishi Denki Kabushiki Kaisha, Tokyo, Japan

[21] Appl. No.: 244,067

[22] Filed: Sep. 14, 1988

[30] Foreign Application Priority Data

Sep. 14, 1987 [JP] Japan .......................... 62-140308[U]

[51] Int. Cl.⁴ ................................................ F25B 1/00
[52] U.S. Cl. ...................................... 62/209; 62/228.4
[58] Field of Search ....................... 62/228.4, 231, 209

[56] References Cited

FOREIGN PATENT DOCUMENTS 0009443 1/1984 Japan ................................. 62/228.4
0033246 2/1987 Japan ................................... 62/180
2152246-A 7/1985 United Kingdom .............. 62/228.4

Primary Examiner—William E. Wayner
Attorney, Agent, or Firm—Oblon, Spivak, McClelland, Maier & Neustadt

[57] ABSTRACT

In the air conditioning control apparatus of the present invention, the frequency determining means determines not only an operation frequency for the compressor depending on the load determined based on the detected room temperature and the set room temperature, but also an upper limit for the compressor operation frequency based on the air flow rate of the outlet air from the upper and lower outlet ports of the indoor unit and the successive operation time of the compressor. As a result, even if the compressor carriers out cooling operation under too great of a load, the temperature of the air blown off from the upper outlet port of the indoor unit is prevented from dropping down to less than a certain value, thereby eliminating economically the problem wherein dew is produced on the outer surface of the ceiling plate and so on.

1 Claim, 4 Drawing Sheets

AIR CONDITIONER CONTROL APPARATUS

The present invention relates to a control apparatus for an air conditioner which has an indoor unit provided with an upper and a lower outlet ports, and air blowers housed therein so as to face the upper and the lower outlet ports, respectively. More particularly, it relates to an operation frequency control apparatus for a compressor in such air conditioner.

The indoor unit of an conventional air conditioner will be explained in reference to FIGS. 4 and 5.

FIG. 4 is a vertical cross sectional view showing the indoor unit as, for example, disclosed in Japanese Examined Patent Publication No. 38383/1986. The indoor unit includes an upper air blower 1 provided in an upper portion in the inside of a main body A, a lower air blower 2 provided in a lower portion in the inside of the main body A, an indoor heat exchanger 3 positioned at a front portion in the main body A between the upper air blower 1 and the lower air blower 2, an upper outlet port 4 formed in an upper front part of the main body A so as to face the upper air blower 1, and a lower outlet port 5 formed in a lower front part of the main body A so as to face the lower air blower 2. An arrow 6 indicates the flow of the air which is sucked in the main body through the indoor heat exchanger 3 by the upper air blower 1 and the lower air blower 2 and then is blown off from the upper outlet port 4 and the lower outlet port 5.

In addition, the air conditioner has a rotation-controlled compressor, an outdoor heat exchanger, and expansion means, which constitute a refrigerating cycle together with the indoor heat exchanger.

FIG. 5 is a block diagram showing the compressor frequency control apparatus which is provided in the conventional air conditioner as shown in FIG. 4. Reference numeral 11 designates room temperature detecting means. Reference numeral 12 designates room temperature setting means. Reference numeral 13 designates load determining means which determines a load based on the room temperature detected by the room temperature detecting means 11 and the set room temperature set by the room temperature setting means 12. Reference numeral 14 designates frequency determining means which determines an operation frequency for the compressor depending on the load determined by the load determining means 13.

In operation, on cooling and heating, the load determining means 13 determines whether a cooling (heating) load for a room with the indoor unit installed is large or small, depending on the difference between the room temperature detected by the room temperature detecting means 11 and the set room temperature set by the room temperature setting means 12. The frequency determining means 14 determines the compressor operation frequency so that when the load is large, the frequency is high and when the load is small, the frequency is low.

As explained above, the conventional air conditioner has adopted the system wherein the compressor operational frequency is determined depending only on the load calculated based on the actual room temperature and the set room temperature. As a result, when the load becomes too great on cooling, the compressor operation frequency becomes too high, creating a problem wherein cooled air blown off from the upper outlet port of the indoor unit makes dew on the outer surface of the ceiling plate and so on.

It is an object of the present invention to eliminate such problem, and to provide an air conditioner control apparatus capable of avoiding the case wherein dew is produced on the outer surface of the ceiling plate and so on due to the outlet air temperature from the indoor unit even if the air conditioner is successively driven under too great of a load for a long time on cooling.

The foregoing and the other objects of the present invention have been attained by providing an air conditioner control apparatus comprising load determining means for determining a load based on an actual room temperature and a set room temperature, air flow rate judging means for judging an air flow rate from an upper and a lower outlet port of the indoor unit, time calculating means for calculating the successive operation time of a compressor, and frequency determining means for determining an upper frequency limit for the compressor based on the output information from the respective means.

In accordance with the air conditioning control apparatus of the present invention, the frequency determining means determines not only the operation frequency for the compressor depending on the load determined based on the detected room temperature and the set room temperature, but also the upper limit for the compressor operation frequency based on the air flow rate of the outlet air from the upper and lower outlet ports of the indoor unit and the successive operation time of the compressor. As a result, even if the compressor carries out cooling operation under too great of a load, the temperature of the air blown off from the upper outlet port of the indoor unit is prevented from dropping down to less than a certain value, thereby eliminating economically the problem wherein dew is produced on the outer surface of the ceiling plate and so on.

Now, the present invention will be described in detail with reference to a preferred embodiment illustrated in the accompanying drawings.

Figure 1:
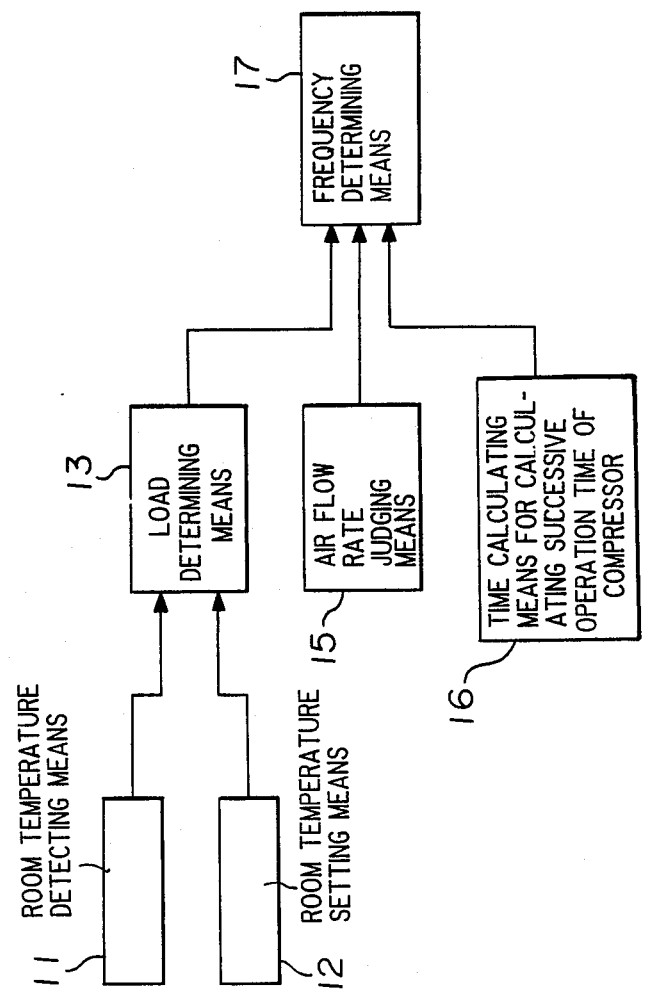
FIG. 1 is a block diagram showing an embodiment of the air conditioner controlling apparatus according to the present invention.

FIG. 1 is a block diagram showing the embodiment of the air conditioner compressor control apparatus according to the present invention. In FIG. 1, reference numeral 11 designates room temperature detecting means for detecting the temperature in a room to be air conditioned. Reference numeral 12 designates room temperature setting means for setting a desired temperature in the room.

Reference numeral 13 designates load determining means for determining a load based on the room temperature detected by the room temperature detecting means 11 and the desired room temperature set by the room temperature setting means 12. Reference numeral 15 designates air flow rate judging means for judging an air flow rate from an upper and a lower outlet port of the indoor unit.

Reference numeral 16 designates time calculating means for calculating the successive operation time of an rotation-controlled compressor. Reference numeral 17 designates frequency determining means for determining the operation frequency for the compressor based on the load determined by the load determining means 13, the air flow rate determined by the air flow rate determining means 15 and the compressor successive operation time calculated by the compressor successive operation time calculating means 16.

Figure 2:
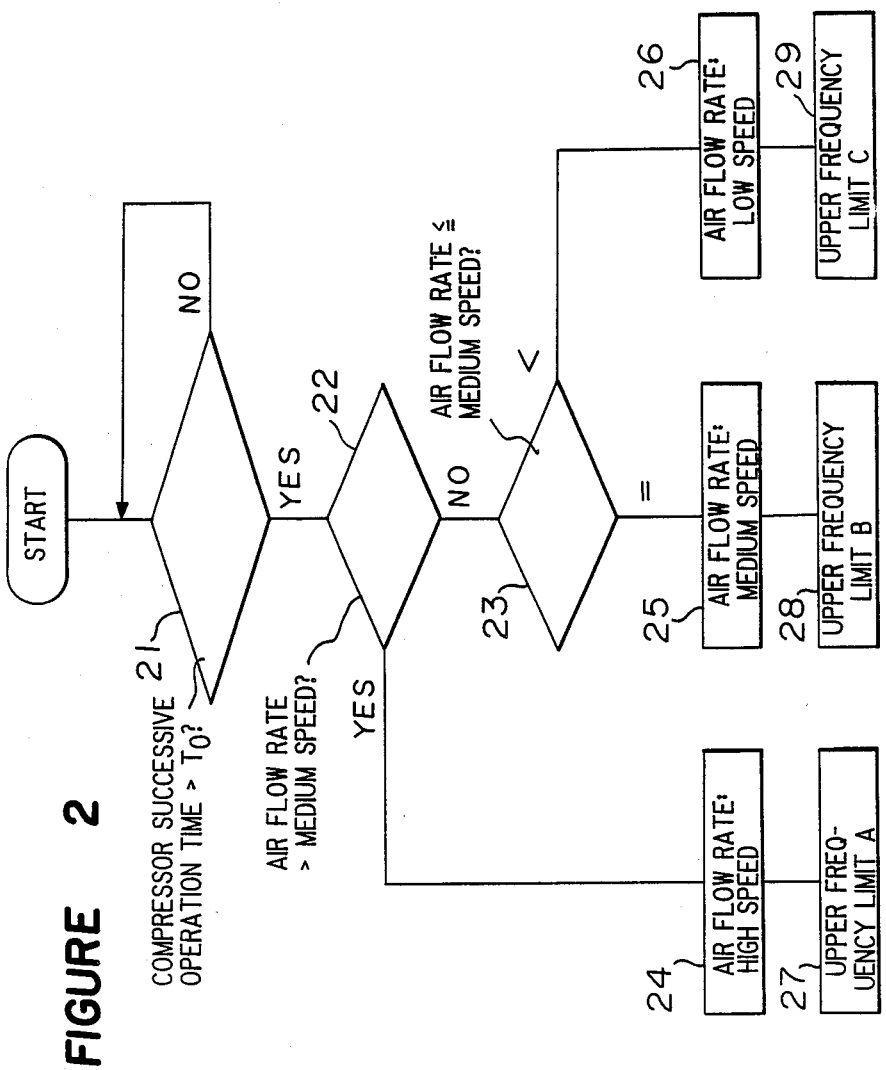
FIG. 2 is a flow chart showing the procedure wherein a compressor operation frequency is determined.

Next, the operation of the control apparatus of the embodiment as constituted as stated above will be described in reference to a flow chart as shown in FIG. 2.

When, first, the compressor operation frequency is determined by the frequency determining means 17 depending on the load determined by the load determining means 13 as conventional, and the compressor starts operation under the determined operation frequency. After that, at a Step 21, the time calculating means 16 judges whether the successive operation time of the compressor is beyond a certain value $T_O$ or not.

If affirmative, the air flow rate judging means 15 determines whether the air flow rate blown off from the upper and the lower outlet port of the indoor unit main body is higher than a medium speed or not at the next Step 22.

If it is judged that the air flow rate is higher than the medium speed, the procedure proceeds to a Step 24, where it is determined that the outlet air flow rate is a high speed. And, accordingly, the frequency determining means 17 determines the compressor operation frequency to be an upper frequency limit A at a Step 27.

When it is judged that the air flow rate is equal to or slower than the medium speed (at the Step 22), the procedure proceeds to a Step 23. In the Step 23, it is judged whether the outlet air flow rate is slower than the medium speed or equal to the medium speed. When it is judged that the air flow rate is equal to the medium speed, the procedure proceeds to a Step 25. In the Step 25, the outlet air flow rate is determined to be the medium speed, and, accordingly, the compressor operation frequency is determined to be an upper frequency limit B which is lower than the limit A, at a Step 28.

When it is judged at the Step 23 that the outlet air flow rate is slower than medium speed, the procedure proceeds to a Step 26. In the Step 26, the outlet air flow rate is determined to be a low speed, and, accordingly, the compressor operation frequency is determined to be an upper frequency limit C which is lower than the limit B at a Step 29.

Figure 3:
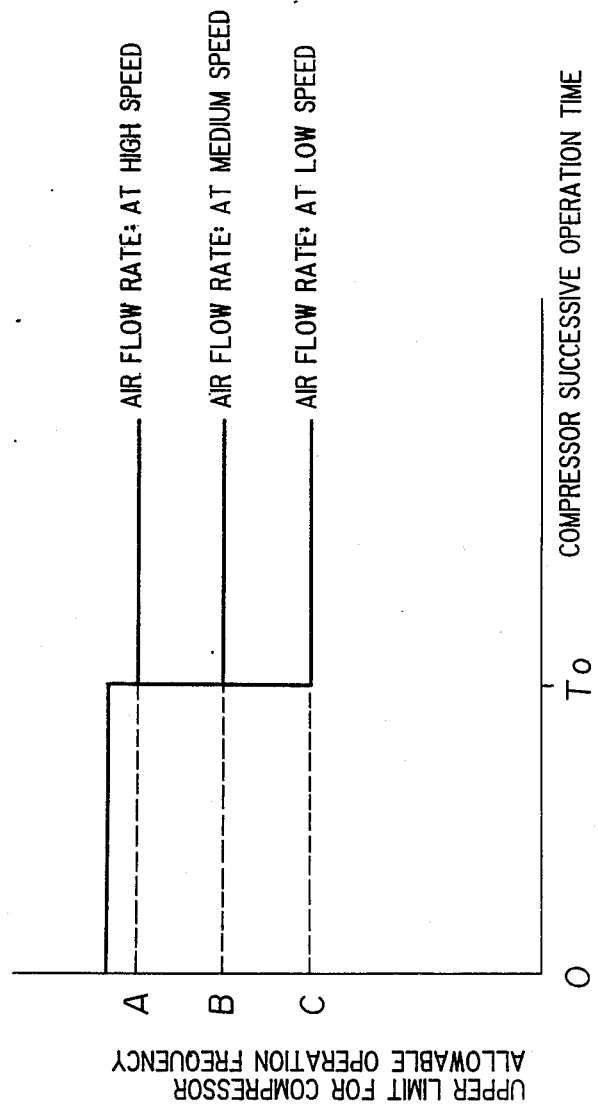
FIG. 3 is a graphical representation to help explain in the operation as made according to the procedure as shown in FIG. 2.
Figure 4:
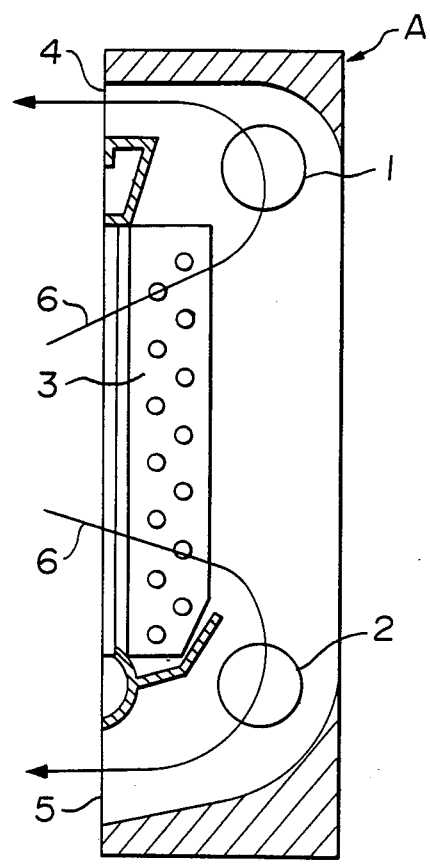
FIG. 4 is a vertical cross sectional view showing the indoor unit main body of an conventional air conditioner.
Figure 5:
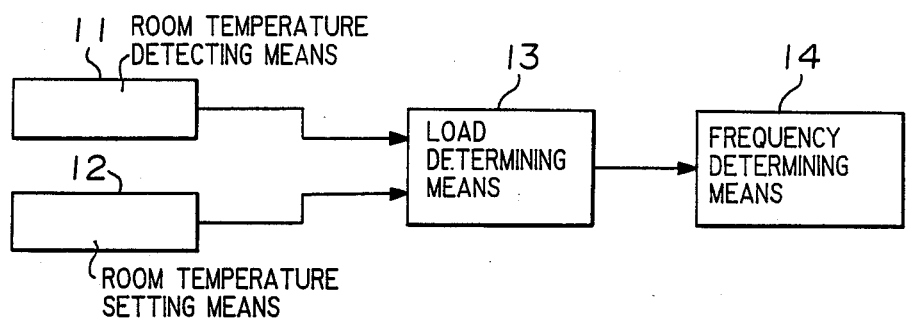
FIG. 5 is a block diagram showing the conventional compressor frequency control apparatus.

FIG. 3 is a graphical representation showing how the upper limits for the compressor operation frequency are determined to A, B and C according to the change of the outlet air flow rate to the high speed, the medium speed and the low speed when the compressor is successively driven under too great of a load for more than $T_0$ time.

The adoption of such control can prevent the temperature of the outlet air from the upper outlet port from dropping to less than a certain value even if the compressor carries out cooling under too great of a load, and dew from being produced on the outer surface of the ceiling plate and so on.

We claim:

1. A control apparatus for an air conditioner having a refrigerating cycle including a rotation-controlled compressor, an outdoor heat exchanger, expansion means and an indoor heat exchanger, and having air blowers provided in an upper and a lower outlet port of the indoor unit main body, respectively, comprising:

room temperature detecting means for detecting the temperature in a room to be air conditioned, room temperature setting means for setting a desired room temperature, load determining means for determining a load based on the difference between the temperature detected by the room temperature detecting means and the temperature set by the room temperature setting means, frequency determining means for determining the operation frequency for the compressor depending on the load determined by the load determining means, air flow rate judging means for judging an air flow rate from the outlet ports, and time calculating means for calculating the successive operation time of the compressor, wherein the frequency determining means determines an upper frequency limit for the compressor operation frequency based on the output information from the air flow rate judging means and the time calculating means.

* * * * *